United States Patent
Lee

(10) Patent No.: US 11,716,147 B2
(45) Date of Patent: Aug. 1, 2023

(54) OPTICAL COMMUNICATION DEVICE AND OPTICAL COMMUNICATION SYSTEM INCLUDING THE SAME

(71) Applicant: SOLiD, INC., Seongnam-si (KR)

(72) Inventor: Eun Sung Lee, Ansan-si (KR)

(73) Assignee: SOLiD, INC., Seongnam-si (KR)

( * ) Notice: Subject to any disclaimer, the term of this patent is extended or adjusted under 35 U.S.C. 154(b) by 0 days.

(21) Appl. No.: 17/397,018

(22) Filed: Aug. 9, 2021

(65) Prior Publication Data

US 2022/0045758 A1 Feb. 10, 2022

(30) Foreign Application Priority Data

Aug. 10, 2020 (KR) .................. 10-2020-0100096
Aug. 6, 2021 (KR) .................. 10-2021-0104025

(51) Int. Cl.
*H04B 10/27* (2013.01)
(52) U.S. Cl.
CPC .................. *H04B 10/27* (2013.01)
(58) Field of Classification Search
CPC ... H04B 10/27; H04B 10/071; H04B 10/0797
See application file for complete search history.

(56) References Cited

U.S. PATENT DOCUMENTS 6,198,721 B1 3/2001 Mueller
6,400,476 B1 * 6/2002 Arecco ............ H04B 10/25891
398/59
2018/0375580 A1 * 12/2018 Tanimura ............ G01M 11/335
2019/0097988 A1 * 3/2019 Nakada ................ H04B 10/075
2021/0167987 A1 * 6/2021 Saltsidis ........... H04W 28/0231

FOREIGN PATENT DOCUMENTS

EP           1 505 753 A2    2/2005
KR     10-2019-0070148 A     6/2019
WO          01/45311 A1      6/2001
WO          03/052978 A1     6/2003

OTHER PUBLICATIONS

Extended European Search Report dated Jan. 21, 2022, issued by the European Patent Office in application No. 21190513.8.

* cited by examiner

*Primary Examiner* — Dzung D Tran
(74) *Attorney, Agent, or Firm* — Sughrue Mion, PLLC

(57) ABSTRACT

Provided is an optical communication device including: a first channel card configured to convert an input first signal into a first optical signal and output the first optical signal to any one of a first MUX/DEMUX connected to a first optical line and a second MUX/DEMUX connected to a second optical line; a second channel card configured to convert an input second signal into a second optical signal and output the second optical signal to any one of the first MUX/DEMUX and the second MUX/DEMUX; and a controller configured to monitor states of the first optical line and the second optical line to determine a MUX/DEMUX from which the first optical signal and the second optical signal are respectively output, from among the first MUX/DEMUX and the second MUX/DEMUX.

11 Claims, 3 Drawing Sheets

OPTICAL COMMUNICATION DEVICE AND OPTICAL COMMUNICATION SYSTEM INCLUDING THE SAME

CROSS-REFERENCE TO RELATED APPLICATIONS

This application claims the benefits of Korean Patent Applications No. 10-2020-0100096, filed on Aug. 10, 2020 and No. 10-2021-0104025, filed on Aug. 6, 2021, in the Korean Intellectual Property Office, the disclosures of which are incorporated herein in their entireties by reference.

BACKGROUND

1. Field

The disclosure relates to an optical communication device and an optical communication system including the same, and more particularly, to an optical communication device capable of individually switching optical lines for a plurality of optical communication modules therein, and an optical communication device including the same.

2. Description of the Related Art

Research and development on a passive optical network (hereinafter referred to as 'WDM-PON') based on wavelength division multiplexing (WDM) is being actively conducted. In the WDM-PON, communication is performed between a transmitting device and a receiving device using a wavelength determined for each receiving device. As described above, because a dedicated wavelength is used for each receiving device in the WDM-PON, security is excellent, a large-capacity communication service is possible, and other transmission technologies (e.g., Link Rate, Frame Format, etc.) may be applied.

In such a WDM-PON, when communication is performed through a single optical line, the entire network may become out of service when the corresponding optical line is disconnected or attenuation increases due to aging. In order to solve this problem, in the WDM-PON, an optical line is duplicated, and when a failure is found in a main optical line, communication is performed through a sub optical line.

However, according to this WDM-PON configuration, even when an error occurs in only one of a plurality of channel cards formed in a transmitting device, for example, a central office terminal (COT), the entire optical line needs to be switched to a sub optical line. This causes inconvenience in that a receiving device connected to other normal channel cards, for example, a remote terminal (RT), has to perform communication through a sub optical line.

SUMMARY

Provided are an optical communication device capable of individually switching optical lines only for an optical communication module in which an error occurs from among a plurality of optical communication modules configured therein, and an optical communication system including the same.

The disclosure is not limited to the above objectives, but other objectives not described herein may be clearly understood by one of ordinary skill in the art from descriptions below.

According to an aspect of the disclosure, there is provided an optical communication device, the optical communication device includes: a first channel card configured to convert an input first signal into a first optical signal and output the first optical signal to any one of a first MUX/DEMUX connected to a first optical line and a second MUX/DEMUX connected to a second optical line; a second channel card configured to convert an input second signal into a second optical signal and output the second optical signal to any one of the first MUX/DEMUX and the second MUX/DEMUX; and a controller configured to monitor states of the first optical line and the second optical line to determine a MUX/DEMUX from which the first optical signal and the second optical signal are respectively output, from among the first MUX/DEMUX and the second MUX/DEMUX.

According to an exemplary embodiment, the first channel card may include an optical transmission/reception module configured to convert the first signal into the first optical signal of a preset wavelength and output the first optical signal; and a first switch configured to connect the optical transmission/reception module to the first MUX/DEMUX or the second MUX/DEMUX according to a first control signal, wherein the controller may output the first control signal to the first switch by monitoring the states of the first optical line and the second optical line.

According to an exemplary embodiment, the first channel card may further include a second switch configured to connect the optical transmission/reception module to the first MUX/DEMUX or the second MUX/DEMUX according to a second control signal, wherein the optical transmission/reception module may convert an optical signal input through the second switch into an electrical signal, and the controller may output the second control signal to the second switch by monitoring the states of the first optical line and the second optical line.

According to an exemplary embodiment, the controller may monitor the state of the first optical line by using first state information received from a first monitoring device connected to the first optical line, and monitor the state of the second optical line by using second state information received from a second monitoring device connected to the second optical line.

According to another aspect of the disclosure, there is provided an optical communication device connected to the above-described optical communication device through a first optical line or a second optical line, the optical communication device includes: a first coupler connected to the first optical line and configured to couple and output a portion of the first optical signal input from the first optical line; a second coupler connected to the second optical line and configured to couple and output a portion of the second optical signal input from the second optical line; and a third coupler connected to the first coupler and the second coupler and configured to couple and output optical signals input from the first coupler and the second coupler.

According to an exemplary embodiment, the third coupler may split an input third optical signal and output the split third optical signal to the first coupler and the second coupler, respectively, the first coupler may output a portion of the split input third optical signal to the first optical line, and the second coupler may output another portion of the split input third optical signal to the second optical line.

According to an exemplary embodiment, the third optical signal may be split and transmitted to the above-described optical communication device through any one of the first optical line and the second optical line.

According to another aspect of the disclosure, there is provide an optical communication system, the optical communication system includes: a first optical communication device configured to convert an input first signal into a first optical signal and transmit the converted first optical signal, and to convert an input second signal into a second optical signal and transmit the converted second optical signal; and a second optical communication device connected to the first optical communication device through a first optical line or a second optical line to receive at least one of the first optical signal and the second optical signal, wherein the first optical communication device includes: a first channel card configured to convert the first signal into the first optical signal and output the first optical signal to any one of a first MUX/DEMUX connected to the first optical line and a second MUX/DEMUX connected to the second optical line; a second channel card configured to convert the second signal into the second optical signal and output the second optical signal to any one of the first MUX/DEMUX and the second MUX/DEMUX; and a controller configured to monitor states of the first optical line and the second optical line to determine a MUX/DEMUX from which the first optical signal and the second optical signal are respectively output, from among the first MUX/DEMUX and the second MUX/DEMUX.

According to an exemplary embodiment, the first channel card may include an optical transmission/reception module configured to convert the first signal into the first optical signal of a preset wavelength and output the first optical signal; and a first switch configured to connect the optical transmission/reception module to the first MUX/DEMUX or the second MUX/DEMUX according to a first control signal, wherein the controller may output the first control signal to the first switch by monitoring the states of the first optical line and the second optical line.

According to an exemplary embodiment, the first channel card may further include a second switch configured to connect the optical transmission/reception module to the first MUX/DEMUX or the second MUX/DEMUX according to a second control signal, wherein the optical transmission/reception module may convert an optical signal input through the second switch into an electrical signal, and the controller may output the second control signal to the second switch by monitoring the first optical line and the second optical line.

According to an exemplary embodiment, the controller may monitor the state of the first optical line by using first state information received from a first monitoring device connected to the first optical line, and monitor the state of the second optical line by using second state information received from a second monitoring device connected to the second optical line.

According to an exemplary embodiment, the second optical communication device may include a first coupler connected to the first optical line and configured to couple and output a portion of any one optical signal input from the first optical line, from among the first optical signal and the second optical signal; a second coupler connected to the second optical line and configured to couple and output a portion of the other optical signal input from the second optical line, from among the first optical signal and the second optical signal; and a third coupler connected to the first coupler and the second coupler and configured to couple and output optical signals input from the first coupler and the second coupler.

According to an exemplary embodiment, the third coupler may split an input third optical signal and output the split third optical signal to the first coupler and the second coupler, respectively, the first coupler may output a portion of the split input third optical signal to the first optical line, and the second coupler may output another portion of the split input third optical signal to the second optical line.

According to an exemplary embodiment, the third optical signal may be split and transmitted to the first optical communication device through any one of the first optical line and the second optical line.

An optical communication device and an optical communication system including the same according to embodiments may individually switch optical lines only for an optical communication module in which an error occurs from among a plurality of optical communication modules configured therein.

Effects obtainable by the disclosure are not limited to the effects described above, but other effects not described herein may be clearly understood by one of ordinary skill in the art from the above descriptions.

BRIEF DESCRIPTION OF THE DRAWINGS

Embodiments of the disclosure will be more clearly understood from the following detailed description taken in conjunction with the accompanying drawings in which.

DETAILED DESCRIPTION

Figure 1:
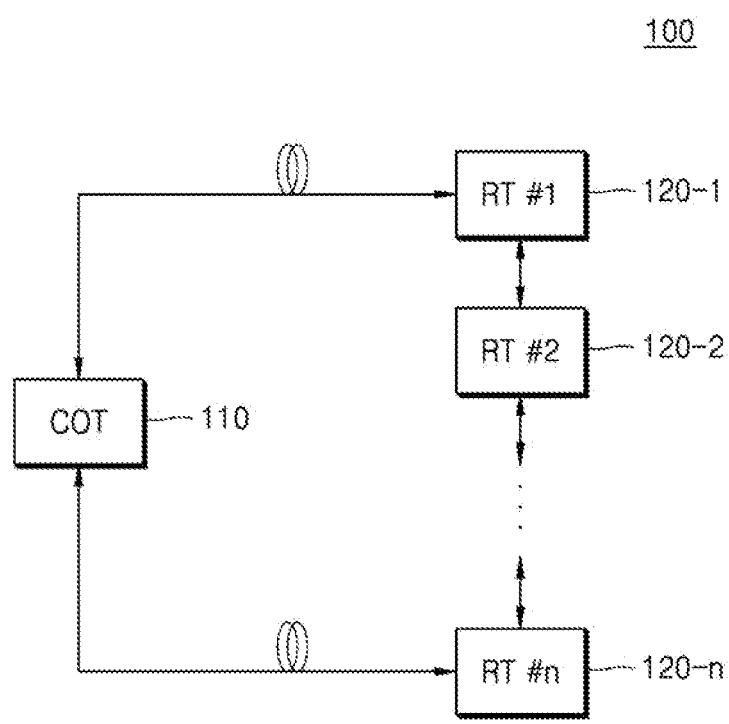
FIG. 1 is a block diagram of an optical communication system according to an embodiment.

Since the disclosure may have diverse modified embodiments, preferred embodiments are illustrated in the drawings and are described in the detailed description. However, this is not intended to limit the disclosure to particular modes of practice, and it is to be appreciated that all changes, equivalents, and substitutes that do not depart from the scope of the inventive concept of the disclosure are encompassed in the disclosure.

In the description of the disclosure, certain detailed explanations of the related art are omitted when it is deemed that they may unnecessarily obscure the essence of the disclosure. In addition, numeral figures (e.g., first, second, and the like) used during describing the specification are just identification symbols for distinguishing one element from another element.

Further, in the specification, if it is described that one component "is connected to" or "accesses" the other component, it is understood that the one component may be directly connected to or may directly access the other component but unless explicitly described to the contrary, another component may be "connected" or "access" between the components.

In addition, terms including "unit," "er," "or," "module," and the like disclosed in the specification mean a unit that processes at least one function or operation and this may be implemented by hardware or software such as a processor, a micro processor, a micro controller, a central processing unit (CPU), a graphics processing unit (GPU), an accelerated processing unit (APU), a digital signal processor (DSP), an application specific integrated circuit (ASIC), and a field programmable gate array (FPGA) or a combination of hardware and software.

In addition, it is intended to clarify that the division of the components in the specification is only made for each main function that each component is responsible for. That is, two or more components to be described later below may be combined into one component, or one components may be divided into two or more components according to more subdivided functions. In addition, it goes without saying that each of the components to be described later below may additionally perform some or all of the functions of other components in addition to its own main function, and some of the main functions that each of the components is responsible for may be dedicated and performed by other components.

An optical communication system according to embodiments may be applied to various optical communication networks based on a wavelength division multiplexing-passive optical network (WDM-PON), which are composed of optical communication devices located remotely from each other that transmit and receive optical signals through corresponding optical communication modules (optical transceiver).

For example, the optical communication system may configure an optical transport network that is a sub-network constituting a fronthaul segment of a radio access network architecture. However, the disclosure is not limited thereto, and the inventive concept of the disclosure may be applied to a midhaul segment and a backhaul segment of the radio access network architecture. As another example, the optical communication system may be applied to an optical subscriber network. As another example, the optical communication system may be applied to a distributed antenna system (DAS) for resolving a shadow area of a base station.

Hereinafter, for convenience of description, in a case where the optical communication system configures a fronthaul segment of the radio access network architecture described above, an embodiment of a system including an optical communication device (e.g., a central office terminal (COT)) connected to a digital unit or baseband unit at a central office side and an optical communication device (e.g., a remote terminal (RT)) connected to a remote unit or remote radio head at a remote location will be mainly described.

Hereinafter, various embodiments will be described in detail in order.

FIG. 1 is a block diagram of an optical communication system according to an embodiment.

Referring to FIG. 1, an optical communication system 100 according to an embodiment may include a COT 110 and n RTs 120-1 to 120-$n$ (n is a natural number). The COT 110 and the n RTs 120-1 to 120-$n$ may form a ring topology.

For example, the optical communication system 100 according to an embodiment may form a ring topology with the COT 110 and two RTs 120-1 and 120-2. In this case, two optical lines may be connected to the COT 110. One of the two optical lines connected to the COT 110 may be connected to the first RT 120-1, and the other one may be connected to the second RT 120-2. In addition, the first RT 120-1 and the second RT 120-2 may be interconnected through a separate optical line. Due to this, the COT 110 and the plurality of RTs 120-1 to 120-$n$ may form a ring topology.

The COT 110 may be a device that multiplexes base station signals on a central office side and transmits them to one or more connected RTs (at least one of 120-1 to 120-$n$). For example, the COT 110 may receive a signal from a digital unit (DU) (not shown) and convert the signal into a WDM signal. In addition, the COT 110 may transmit the WDM signal to one or more RTs (one or more of 120-1 to 120-$n$) connected to the COT 110 through an optical line. In the example of FIG. 1, the COT 110 may transmit a WDM signal to the first RT 120-1 through a first optical line, and transmit a WDM signal to the n$^{th}$ RT 120-$n$ through a second optical line. However, the base station signal may be a baseband signal conforming to a standard of a fronthaul link, such as Common Public Radio Interface (CPRI), Open Base Station Architecture Initiative (OBSAI), and Open Radio Equipment Interface (ORI).

The COT 110 may transmit a WDM signal to the first RT 120-1 through the first optical line, and the first RT 120-1 may filter a signal transmitted to the first RT 120-1 from the WDM signal and then transmit the remaining signals to the second RT 120-2. After filtering a signal transmitted to the second RT 120-2 from among signals received from the first RT 120-1, the second RT 120-2 may transmit the remaining signals to the third RT 120-3. In this way, the n$^{th}$ RT 120-$n$ may transmit a preset signal (e.g., a WDM signal, etc.) to the COT 110 through the second optical line after receiving a signal from the (n−1)$^{th}$ RT 120-($n$−1) (or may not transmit a preset signal).

Each of the RTs 120-1 to 120-$n$ is located on the side of an individual base station and is a device in charge of interfacing with a remote unit (RU) (not shown) or the like. Each of the RTs 120-1 to 120-$n$ may be connected to the COT 110 and transmit a signal received from the COT 110 to the RU or the like. As described above, the COT 110 and each of the RTs 120-1 to 120-$n$ may form a ring topology.

On the other hand, the COT 110 according to an embodiment may switch an optical line for transmission by controlling n channel cards respectively connected to the RTs 120-1 to 120-$n$. Hereinafter, connection switching operations between the COT 110 and the RTs 120-1 and 120-$n$ will be described in more detail.

Figure 2:
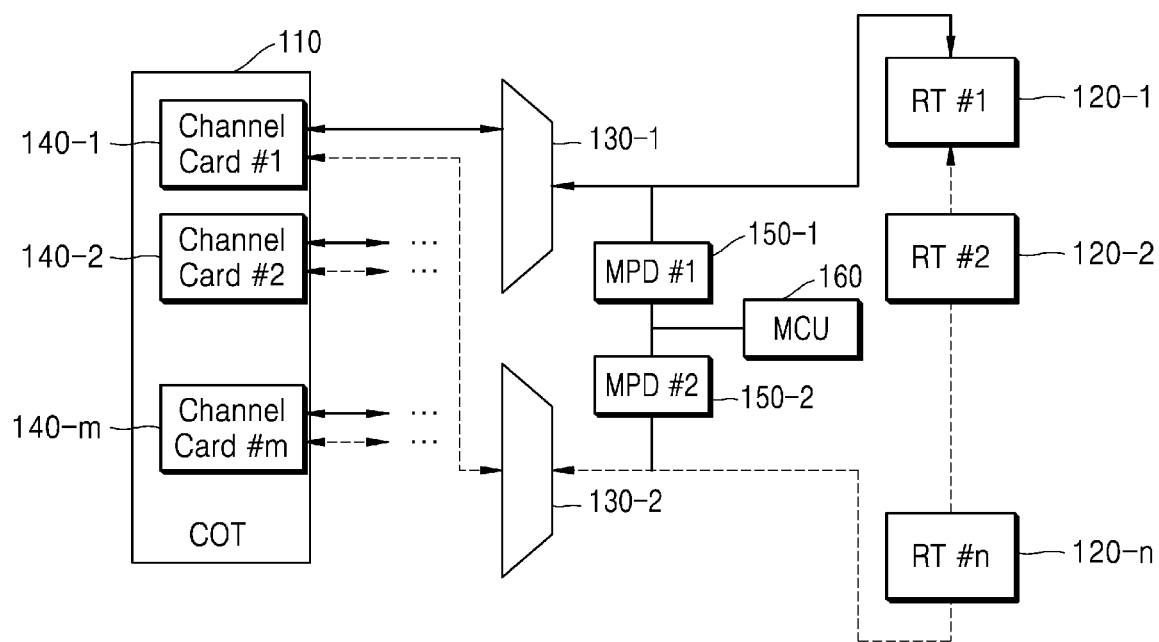
FIG. 2 is a block diagram of an optical communication device according to an embodiment.

FIG. 2 is a block diagram of an optical communication device according to an embodiment.

Referring to FIG. 2, the COT 110 according to an embodiment may include m channel cards 140-1 and 140-2 to 140-$m$ (m is a natural number). Each channel card (any one of 140-1 and 140-2 to 140-$m$) of the COT 110 may be connected to a first MUX/DEMUX 130-1 and a second MUX/DEMUX 130-2. The first MUX/DEMUX 130-1 and/or the second MUX/DEMUX 130-2 may be formed inside the COT 110. In addition, the first MUX/DEMUX 130-1 may be connected to the first RT 120-1 through a first optical line. In addition, the second MUX/DEMUX 130-2 may be connected to the n$^{th}$ RT 120-$n$ through a second optical line. The first RT 120-1 may be connected to the second RT 120-2 through another optical line, the second RT 120-2 may be connected to the third RT 120-3 through another optical line, and in the same way, the (n−1)$^{th}$ RT 120-($n$−1) may be connected to the n$^{th}$ RT 120-$n$ through another optical line. That is, the COT 110 and m RTs 120-1 to 120-$m$ may form a ring topology.

In addition, the first optical line connecting the first MUX/DEMUX 130-1 to the first RT 120-1 may be connected to a first monitoring device 150-1 (MPD #1). The first monitoring device 150-1 may include a photodiode for monitoring the performance status of the first optical line. In addition, the first monitoring device 150-1 may be connected to a controller 160 (MCU). Therefore, the controller 160 will be able to determine the performance status of the first optical line through the photodiode of the first monitoring device 150-1. For example, when an optical power value detected by the first monitoring device 150-1 is less than or equal to a preset value, the controller 160 may determine that the performance of the first optical line is degraded.

In addition, a second optical line connecting the second MUX/DEMUX 130-2 to the n$^{th}$ RT 120-n may be connected to a second monitoring device 150-2 (MPD #2). The second monitoring device 150-2 may include a photodiode for monitoring the performance status of the second optical line. In addition, the second monitoring device 150-2 may be connected to the controller 160 (MCU). Therefore, the controller 160 will be able to determine the performance status of the second optical line through the photodiode of the second monitoring device 150-2. For example, when an optical power value in the second monitoring device 150-2 is less than or equal to a preset value, the controller 160 may determine that the performance of the second optical line is degraded. The first monitoring device 150-1, the second monitoring device 150-2, and/or the controller 160 may be formed inside the COT 110. In addition, as a method for the controller 160 to determine the performance of the first optical line and/or the second optical line, various methods other than the above-described method may be applied, and thus a detailed description thereof will not be given herein.

Each of the channel cards 140-1 to 140-m may be selectively connected to the first MUX/DEMUX 130-1 and the second MUX/DEMUX 130-2. For example, the first channel card 140-1 may be selectively connected to the first MUX/DEMUX 130-1 or the second MUX/DEMUX 130-2, the second channel card 140-2 may be selectively connected to the first MUX/DEMUX 130-1 or the second MUX/DEMUX 130-2, and the n$^{th}$ channel card 140-n may be selectively connected to the first MUX/DEMUX 130-1 or the second MUX/DEMUX 130-2. In this case, the MUX/DEMUX to which the channel cards 140-2 to 140-m are respectively connected may not be unified. For example, the first channel card 140-1 and the n$^{th}$ channel card 140-n may be connected to the first MUX/DEMUX 130-1, and the second channel card 140-2 may be connected to the second MUX/DEMUX 130-1.

Hereinafter, an operation in which each of the channel cards 140-1 to 140-m is selectively connected to the second MUX/DEMUX 130-2 will be described in detail with reference to FIG. 3.

Figure 3:
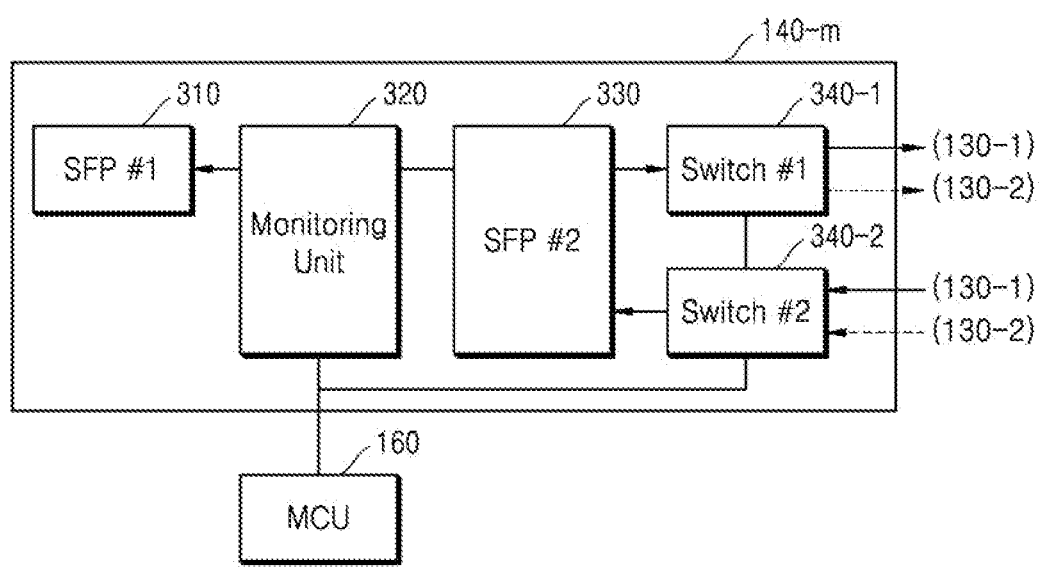
FIG. 3 is a block diagram of a channel card according to an embodiment.

FIG. 3 is a block diagram of a channel card according to an embodiment.

Referring to FIG. 3, the channel card 140-m according to an embodiment may include a first optical transmission/reception module 310 (small form-factor pluggable (SFP) #1), a monitoring unit 320, and a second optical transmission/reception module 330 (SFP #2), a first switch 340-1, and a second switch 340-2. The channel card 140-m is a configuration for converting an input electrical signal into an optical signal or converting an optical signal into an electrical signal. In addition, the monitoring unit 320, the first switch 340-1, and/or the second switch 340-2 of the channel card 140-m may be connected to the controller 160.

First, the first optical transmission/reception module 310 may convert an input optical signal into an electrical signal and output the electrical signal to the monitoring unit 320. In addition, the first optical transmission/reception module 310 may convert an electrical signal input from the monitoring unit 320 into an optical signal and output the optical signal to an external device (e.g., DU, etc.) connected to the first optical transmission/reception module 310 through an optical cable.

The monitoring unit 320 may monitor the input electrical signal to determine whether a normal signal is input. For example, the monitoring unit 320 may check whether the signal is normal by determining a noise ratio of the electrical signal. When it is determined that the input electrical signal is normal, the monitoring unit 320 may output the electrical signal to the second optical transmission/reception module 330. Conversely, the monitoring unit 320 may check whether an electrical signal input from the second optical transmission/reception module 330 is normal, and when the electrical signal is normal, may output the electrical signal to the first optical transmission/reception module 310.

On the other hand, the monitoring unit 320 may be connected to the controller 160 to monitor the state of a first optical line and/or a second optical line through a signal input from the controller 160. This will be described later below.

The second optical transmission/reception module 330 may convert the electrical signal input from the monitoring unit 320 into an optical signal of a preset wavelength and output the optical signal to the first switch 340-1. In addition, the second optical transmission/reception module 330 may convert an optical signal input from the second switch 340-2 into an electrical signal and output the electrical signal to the monitoring unit 320. That is, the first switch 340-1 switches a signal transmitted from the COT 110 to each of the RTs 120-1 to 120-n, and the second switch 340-2 may switch a signal transmitted from each of the RTs 120-1 to 120-n to the COT 110.

On the other hand, as described above, the controller 160 may check the state of the first optical line by using information checked by the first monitoring device 150-1 (hereinafter referred to as 'first state information'). For example, it is assumed that only the first channel card 140-1 from among the m channel cards outputs an optical signal to the first optical line through the first MUX/DEMUX 130-1. At this time, when optical power (i.e., the first state information) checked by a photodiode of the first monitoring device 150-1 is greater than or equal to a preset threshold, the controller 160 may determine that the state of the first optical line is normal and maintain the optical signal of the first channel card 140-1 to be output to the first optical line through the first MUX/DEMUX 130-1. On the other hand, when the optical power checked by the photodiode of the first monitoring device 150-1 is less than a preset threshold, the controller 160 may determine that the state of the first optical line is abnormal and output a control signal to the first switch 340-1 so that the optical signal of the first channel card 140-1 is output to the second optical line through the second MUX/DEMUX 130-2.

In the same way, the controller 160 may check the state of the second optical line by using information checked by the second monitoring device 150-2 (hereinafter referred to as 'second state information'). For example, it is assumed that only the first channel card 140-1 from among the m channel cards receives an optical signal from the second optical line through the second MUX/DEMUX 130-2. At this time, when optical power checked by a photodiode of the second monitoring device 150-2 is greater than or equal to a preset threshold, the controller 160 may determine that the state of the second optical line is normal and maintain an optical signal of each of the RTs 120-1 to 120-n to be received by the first channel card 140-1 through the second optical line and the second MUX/DEMUX 130-2. On the other hand, when the optical power checked by the photodiode of the second monitoring device 150-2 is less than a preset threshold, the controller 160 may determine that the state of the second optical line is abnormal and output a control signal to the second switch 340-2 so that the first channel card 140-1 receives an optical signal through the first optical line and the second MUX/DEMUX 130-2.

The above-described operations of the controller 160 may be respectively applied to the second channel card 140-2 to the m$^{th}$ channel card 140-m. Accordingly, each of the channel cards 140-1 to 140-m may be selectively connected to the first optical line or the second optical line to independently provide an optical communication service.

Meanwhile, although not shown, each of the n RTs 120-1 to 120-n may include a first coupler connected to the first optical line and a second coupler connected to the second optical line. In addition, each of the n RTs 120-1 to 120-n may include a third coupler connected to the first coupler and the second coupler.

The first coupler may output a signal input from the first optical line to the third coupler, and may output a signal input from the third coupler to the first optical line. Similarly, the second coupler may output a signal input from the second optical line to the third coupler, and may output a signal input from the third coupler to the second optical line. The third coupler may combine signals input from the first coupler and the second coupler and output them to the inside of a corresponding RT (any one of 120-1 to 120-n), and may split an optical signal input from the inside of the RT (any one of 120-1 to 120-n) and output the split optical signal to the first coupler and the second coupler. For example, the third coupler may transmit half of an optical signal input from the inside of the RT (any one of 120-1 to 120-n) to the first coupler, and transmit the other half to the second coupler.

Due to this, even if each of the channel cards 140-1 to 140-m of the COT 110 selectively transmits an optical signal through either the first optical line or the second optical line, each of the RTs 120-1 to 120-m may receive the optical signal through the second coupler formed therein. In addition, when transmitting an optical signal to the COT 110, each of the RTs 120-1 to 120-n may transmit the optical signal through both the first optical line and the second optical line. Each of the channel cards 140-1 to 140-m of the COT 110 may receive the optical signal transmitted from each of the RTs 120-1 to 120-n through any one of the first optical line and the second optical line.

As described above, the COT 110 according to the disclosure may individually switch an optical line only for a channel card with abnormal optical communication state from among the plurality of channel cards 140-1 to 140-m configured therein. Due to this, channel cards with normal optical communication state may maintain optical communication through an optical line through which the original communication was made.

While the embodiments have been particularly shown and described, it will be understood by one of ordinary skill in the art that various changes in form and details may be made therein without departing from the inventive concept and the scope of the disclosure as defined by the appended claims.

What is claimed is:

1. An optical communication device comprising:
a first channel card configured to convert an input first signal into a first optical signal and output the first optical signal to any one of a first MUX/DEMUX connected to a first optical line and a second MUX/DEMUX connected to a second optical line;
a second channel card configured to convert an input second signal into a second optical signal and output the second optical signal to any one of the first MUX/DEMUX and the second MUX/DEMUX; and
a controller configured to monitor states of the first optical line and the second optical line to determine a MUX/DEMUX from which the first optical signal and the second optical signal are respectively output, from among the first MUX/DEMUX and the second MUX/DEMUX,
wherein each of the first channel card and the second channel card comprises a first switch configured to selectively establish a connection with one of the first MUX/DEMUX and the second MUX/DEMUX based on the states of the first optical line and the second optical line.

2. The optical communication device of claim 1, wherein the first channel card comprises:
an optical transmission/reception module configured to convert the first signal into the first optical signal of a preset wavelength and output the first optical signal; and
the first switch configured to connect the optical transmission/reception module to the first MUX/DEMUX or the second MUX/DEMUX according to a first control signal,
wherein the controller outputs the first control signal to the first switch by monitoring the states of the first optical line and the second optical line.

3. The optical communication device of claim 2, wherein the first channel card comprises:
a second switch configured to connect the optical transmission/reception module to the first MUX/DEMUX or the second MUX/DEMUX according to a second control signal,
wherein the optical transmission/reception module converts an optical signal input through the second switch into an electrical signal, and
the controller outputs the second control signal to the second switch by monitoring the states of the first optical line and the second optical line.

4. The optical communication device of claim 1, wherein the controller monitors the state of the first optical line by using first state information received from a first monitoring device connected to the first optical line, and
monitors the state of the second optical line by using second state information received from a second monitoring device connected to the second optical line.

5. An optical communication system comprising:
a first optical communication device configured to convert an input first signal into a first optical signal and transmit the converted first optical signal, and to convert an input second signal into a second optical signal and transmit the converted second optical signal; and
a second optical communication device connected to the first optical communication device through a first optical line or a second optical line to receive at least one of the first optical signal and the second optical signal,
wherein the first optical communication device comprises:
a first channel card configured to convert the first signal into the first optical signal and output the first optical signal to any one of a first MUX/DEMUX connected to the first optical line and a second MUX/DEMUX connected to the second optical line;
a second channel card configured to convert the second signal into the second optical signal and output the second optical signal to any one of the first MUX/DEMUX and the second MUX/DEMUX;
a controller configured to monitor states of the first optical line and the second optical line to determine a MUX/DEMUX from which the first optical signal and the second optical signal are respectively output, from among the first MUX/DEMUX and the second MUX/DEMUX, wherein each of the first channel card and the second channel card comprises a first switch configured to selectively establish a connection with one of the first MUX/DEMUX and the second MUX/DEMUX based on the states of the first optical line and the second optical line.

6. The optical communication system of claim 5, wherein the first channel card comprises:

an optical transmission/reception module configured to convert the first signal into the first optical signal of a preset wavelength and output the first optical signal; and the first switch configured to connect the optical transmission/reception module to the first MUX/DEMUX or the second MUX/DEMUX according to a first control signal, wherein the controller outputs the first control signal to the first switch by monitoring the states of the first optical line and the second optical line.

7. The optical communication system of claim 6, wherein the first channel card comprises:

a second switch configured to connect the optical transmission/reception module to the first MUX/DEMUX or the second MUX/DEMUX according to a second control signal, wherein the optical transmission/reception module converts an optical signal input through the second switch into an electrical signal, and the controller outputs the second control signal to the second switch by monitoring the first optical line and the second optical line.

8. The optical communication system of claim 5, wherein the controller monitors the state of the first optical line by using first state information received from a first monitoring device connected to the first optical line, and monitors the state of the second optical line by using second state information received from a second monitoring device connected to the second optical line.

9. The optical communication system of claim 5, wherein the second optical communication device comprises:

a first coupler connected to the first optical line and configured to couple and output a portion of any one optical signal input from the first optical line, from among the first optical signal and the second optical signal;

a second coupler connected to the second optical line and configured to couple and output a portion of the other optical signal input from the second optical line, from among the first optical signal and the second optical signal; and a third coupler connected to the first coupler and the second coupler and configured to couple and output optical signals input from the first coupler and the second coupler.

10. The optical communication system of claim 9, wherein the third coupler splits an input third optical signal and outputs the split third optical signal to the first coupler and the second coupler, respectively, the first coupler outputs a portion of the split input third optical signal to the first optical line, and the second coupler outputs another portion of the split input third optical signal to the second optical line.

11. The optical communication system of claim 10, wherein the third optical signal is split and transmitted to the first optical communication device through any one of the first optical line and the second optical line.

* * * * *